8338X
J. MARSHALL, Jr.
Thrashing Machine.
Patented Aug. 1, 1834.
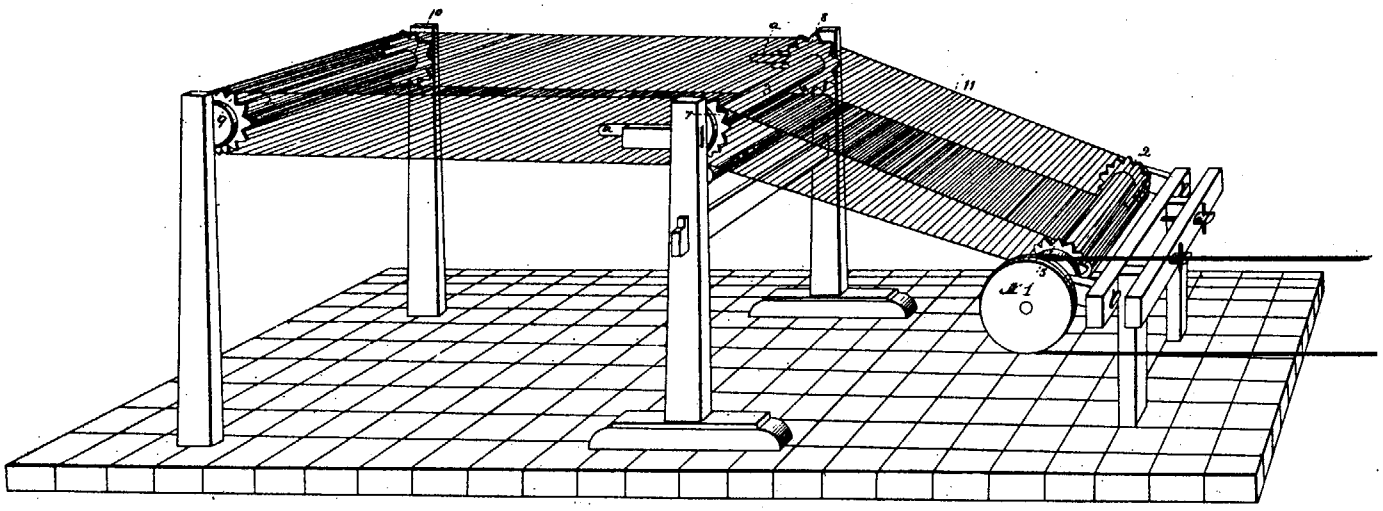
THE NORRIS PETERS CO., PHOTO-LITHO., WASHINGTON, D. C.

John Marshall Jr
Letters Patent.

The Schedule referred to in these Letters Patent and making part of the same, containing a description in the words of [illegible] John Marshall Jr himself of his improvement in the Thrashing machine.

---

To all to whom these Presents shall come—

Be it Known, that I, John Marshall Junr of Sweden in the County of Monroe and State of New York have invented a new & useful improvement in the "Thrashing Machine" and that the following is a full and exact description of the construction and operation of the said Machine as invented or improved by me.

This improvement consists, first, of a screen (No. 11) three feet wide; and formed of two ropes or cords parallel to each other fastened together by wires or wooden cross bars placed at the distance of from one to two inches asunder parallel with each other, each as long as the width of the screen, which screen is continuous being joined at the ends. The screen being thus formed and of suitable length, is then made to pass over three (Nos 2. 3 & 4.) rollers, with cog wheels (Nos 5. 6. 7. 8. 9 & 10.) the one of which rollers is made to roll upon gudgeons connected with the legs of the Thrashing Machine; the second upon posts fixed at proper distances upon the floor of the barn; and the third upon posts placed in the ground out of the barn, and near where the straw of the thrashed grain is to be laid. The Cog Wheels are eleven inches in diameter at the places where the screen presses upon them: the rollers are in the form of axletrees with cog-wheels near the extremities. The middle cog wheel has also two strong
nails or iron pins on each side projecting about one
half inch from the wheel and near the circumference,
for the purpose of forcing up an instrument or hammer
made of iron or wood so as to strike the screen with
sufficient force to shake out from the straw upon it, any
wheat which may remain loosely held therein. This
forcing instrument or hammer is of the width of the
screen and about thirty inches long, formed of two bars
fastened at the extremities by a cross bar, and also to
an axle near the centre; which axle runs upon two
arms fastened near the top of the posts which are
placed upon the floor to sustain the middle roller. The
extremities of this forcing instrument or hammer pass
outside the middle roller and are of such proportions
as to be struck by the iron pins of the middle roller
as it revolves, which forces up the cross bar of the
hammer against the under side of the upper part of
the screen. This screen & the wheels upon which it
revolves, are set in motion by the same power which
moves the Thrashing Machine, and carries the straw
by the same motion out of the barn to its place of
deposite _ all of which will fully appear by refer-
ence to the model accompanying this declaration
and description. _

John Marshall Junr.

Witnesses
Henry W. Taylor
W. Terry (Drawing.)

Exd
JJR

[illegible]